June 12, 1956 D. METTETAL, JR 2,750,225
AUTOMOBILE TRANSPORTING VEHICLE
Filed July 6, 1950 6 Sheets-Sheet 3

Inventor.
Donald Mettetal Jr.
By:-
Cromwell, Greist & Warden Attys.

June 12, 1956  D. METTETAL, JR  2,750,225
AUTOMOBILE TRANSPORTING VEHICLE
Filed July 6, 1950  6 Sheets-Sheet 4

INVENTOR.
Donald Mettetal Jr.
BY
Cromwell, Greist & Warden
Attys.

United States Patent Office 2,750,225
Patented June 12, 1956

2,750,225

AUTOMOBILE TRANSPORTING VEHICLE

Donald Mettetal, Jr., Chicago, Ill., assignor, by mesne assignments, of one-half to Dealers Transit, Inc., Chicago, Ill., a corporation of Illinois, and one-half to Arco Auto Carriers, Inc., Chicago, Ill., a corporation of Illinois Application July 6, 1950, Serial No. 172,226

8 Claims. (Cl. 296—1)

This invention relates to transporting vehicles and is more particularly concerned with improvements in structures of the type now extensively used for the highway transportation of fully assembled automobiles from the assembly plants to the dealers or distributors.

In practically all states there are laws regulating maximum permissible over-all length, maximum width, and in some instances, over-all height of trailers and transporting vehicles used on public highways. Also, the height of such vehicles may be limited by bridge clearance along the principal routes traveled in the transportation of automobiles from the factories to the distributing points.

It is a general object of the invention to provide a transporting vehicle for hauling automobiles over the highways which will meet with the requirements of most of the state laws and which is capable of hauling a maximum number of automobiles within a minimum space.

It is another object of the invention to provide a transporting vehicle of the character described wherein provision is made for hauling five automobiles without the hauling vehicle exceeding the dimensions permitted by highway regulations and the conditions existing on the routes over which the vehicle is to be used.

It is a further object of the invention to provide a compact transporting vehicle wherein a maximum number of cars is accommodated within a framework of minimum dimensions, wherein a relatively simple and inexpensive construction is employed and wherein the cars are supported in a manner which results in a relatively low center of gravity of the total load and even distribution thereof upon the wheels of the hauling vehicle thereby providing for stability during operation.

It is a further object of the invention to provide, in a vehicle for transporting automobiles, a main hauling section and a trailer section, the trailer section being rigidly attached to the main section and operating therewith as a unit while at the same time being detachable therefrom to reduce the capacity of the transporting vehicle.

It is another object of the invention to provide an automobile transporting vehicle consisting of two separable units, one unit containing the power operating means for the vehicle and being provided with supporting means for three automobiles, the other unit being detachable therefrom and having supporting means for two additional automobiles.

It is another object of the invention to provide a vehicle for transporting automobiles comprising a two level track arrangement which is shiftable in part to permit loading of the automobiles on the vehicle in a predetermined order and the positioning of the automobiles in compact relation thereon.

It is another object of the invention to provide in an automobile transporting vehicle a plurality of movable track members which are operated by hydraulic means and which are shiftable in vertical and longitudinal directions to permit loading of the automobiles in a certain predetermined order from the rear end of the vehicle, the automobiles being positioned by movement of the track supporting members to permit compact loading and to reduce the over-all height of the load.

These and other objects of the invention will be apparent from a consideration of the transporting vehicle which is illustrated in the accompanying drawings, wherein.

Referring to the drawings, there is illustrated therein a vehicle for transporting automobiles or similar devices which incorporates the principal features of the invention, the vehicle including a forward or main power hauling section 10 and a rear or trailer section 11.

The main section 10 of the vehicle is supported on front and rear wheel constructions 12 and 13, in the manner of an ordinary freight transporting truck or similar vehicle, the wheel construction including cross frames on which the vehicle body frame is suitably mounted with any conventional type of spring supporting members. The body of the main section 10, which is fabricated from angle iron members, tubing or any other structural elements of sufficient strength, comprises a plurality of longitudinally spaced vertically extending frame forming members 14, 15, 16, 17 and 18 which are connected by longitudinally extending bottom frame forming members 19, 20, 21, and longitudinally extending top frame forming members 22 and 23. Suitable diagonal bracing is provided between the top and bottom frame members as indicated and also outer covering members, if desired.

A driver's cab 24 is supported above the forward portion of the vehicle on the longitudinal top frame members 22, and vertical frame members 14 and 15. The cab 24 is supported in elevated relation above the front wheel construction 12. A fuel tank 25 is positioned at the rear of the cab 24 and supported by brace members 26 extending diagonally from the top frame 23.

The main section 10 of the vehicle includes an engine or power plant and suitable steering mechanism, brakes and other equipment necessary to operate the same, none of which are illustrated since they do not constitute part of the invention.

The bottom frame members 19, 20 and 21 are connected by suitable cross members and a bottom floor structure which is carried above the wheel formation 12 and 13 in a conventional manner with the major portion of the floor extending between the wheels 12 and 13.

The rear or trailer section 11 of the vehicle comprises longitudinally spaced vertically extending side frame forming members 27, 28, 29 and 30 which are suitably connected by diagonal brace members, as indicated, and also by bottom longitudinally extending side frame forming members 31 and 32 and top longitudinally extending side frame forming members 33. The rear portion of the trailer section 11 is supported on a wheel construction 34 which is of a character to permit the trailer section 11 to operate as a unit with the main section 10. The longitudinally extending bottom frame members 31 and 32 are suitably connected by transversely extending frame members and a floor structure which is carried up over the rear wheel construction 34. The top side frame members 33 are connected by a transversely extending frame structure for the upper load carrying tracks which is vertically movable and which will be described.

The forward ends of the bottom side frame members 31 of the trailer unit 11 are detachably connected by separable ball-and-socket joints, pins or other securing means 35, with the rear bottom frame of the main section 10 at both sides of the vehicle so that the sections 10 and 11 operate as a single unit vehicle.

The sections 10 and 11 are both operated by the power plant and steering mechanism provided in the main section 10, which are under the control of the driver seated in the cab 24 above the front wheels 12.

Figure 1:
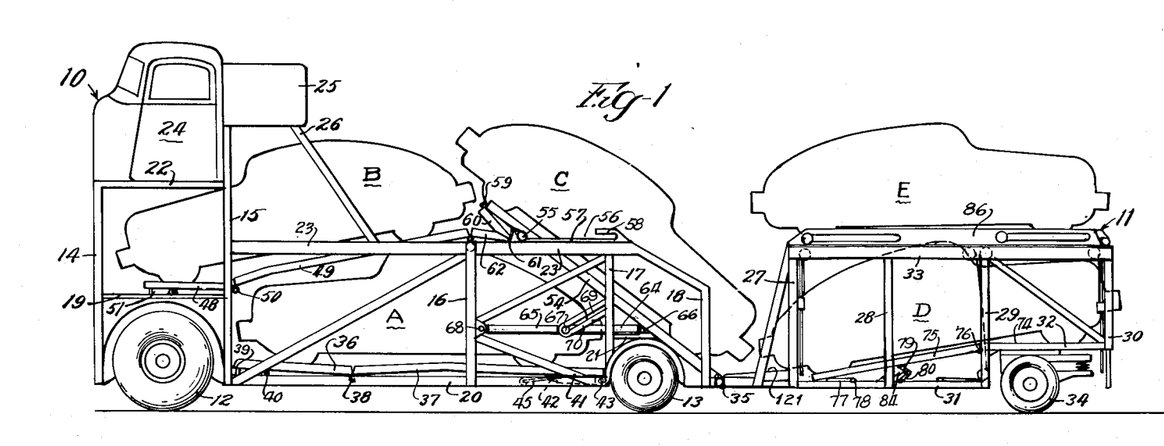
Fig. 1 is a side elevation of an automobile transporting vehicle embodying the principles of the invention, the vehicle shown in fully loaded condition with five automobiles indicated in phantom outline.
Figure 2:
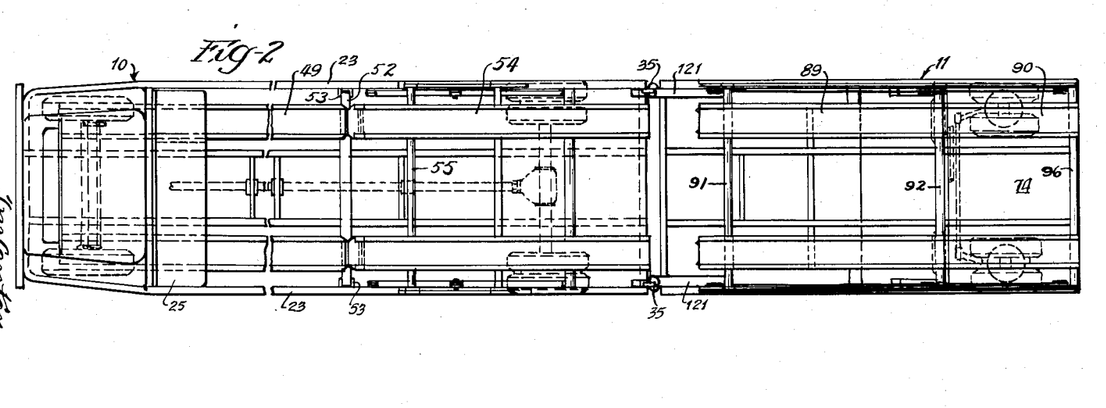
Fig. 2 is a plan view of the vehicle shown in Fig. 1.

As shown in Fig. 1 the two vehicle sections 10 and 11 when connected in operating relation as described are adapted to haul five complete passenger automobiles which are designated in Fig. 1 by the letters A, B, C, D and E, the sequence indicating the order in which the automobiles are loaded. The automobiles are indicated in phantom outline which represents a composite of the maximum dimensions of the different type automobiles which may be hauled on the vehicle.

Track arrangements are provided on both upper and lower decks of both vehicle sections 10 and 11 for supporting the autbomobiles being hauled in nested relation thereon. The supporting track for automobile or car A which is the first car loaded comprises two track sections 36 and 37 each of which are formed by a pair of laterally spaced upwardly opening channel members connected by suitable horizontal cross frame members. The channel members are of sufficient width to accommodate the largest tire or wheel width and form a support for the automobile being hauled. The relatively short forward track section 36 and the somewhat longer rearward track section 37 are pivotally connected to each other and to the bottom floor or frame members 20 at 38.

Figure 9:
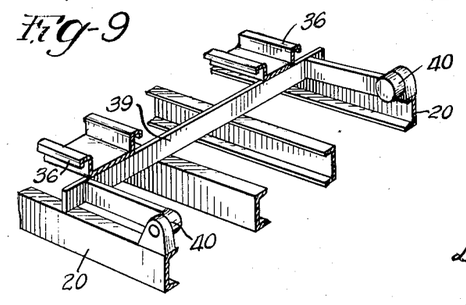
Fig. 9 is a detail perspective view of a front portion of the bottom track on the main section of the vehicle showing the bracket for elevating the track.

The forward section 36 extends from the pivot connection 38 to adjacent the forward vertical frame 15 and rests at its forward end on a U-shaped supporting bar 39 (Fig. 9) having the ends of its relatively short leg members pivotally connected to the vehicle frame at 40. Conventional latching means or stops (not shown) are provided to hold the supporting bar in upwardly swung position for supporting the track section 36 in an elevated position when certain types of vehicles are being hauled to prevent any interference with the driving mechanism of the vehicle over which the track section 36 is positioned.

Figure 3:
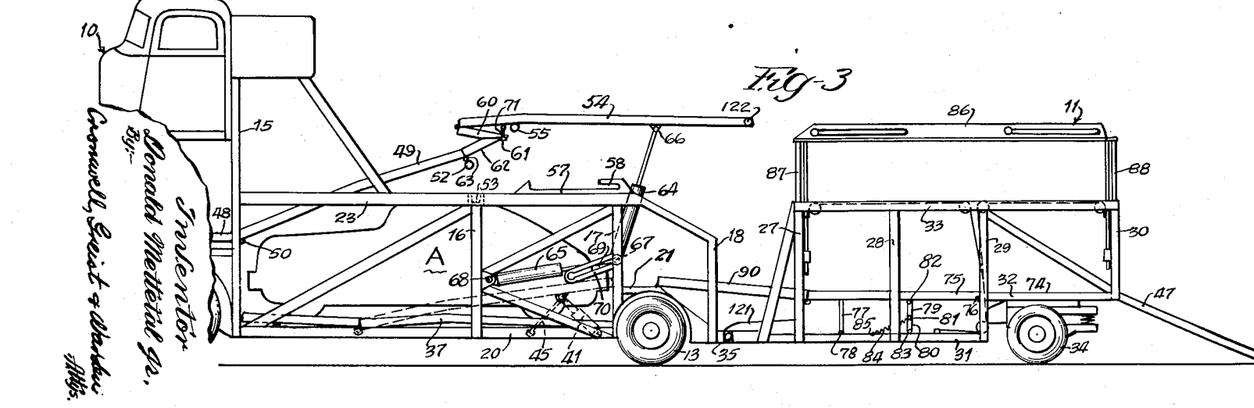
Fig. 3 is a side elevation similar to Fig. 1 with the first automobile loaded thereon, the upper tracks being elevated to permit the loading of the same.
Figure 7:
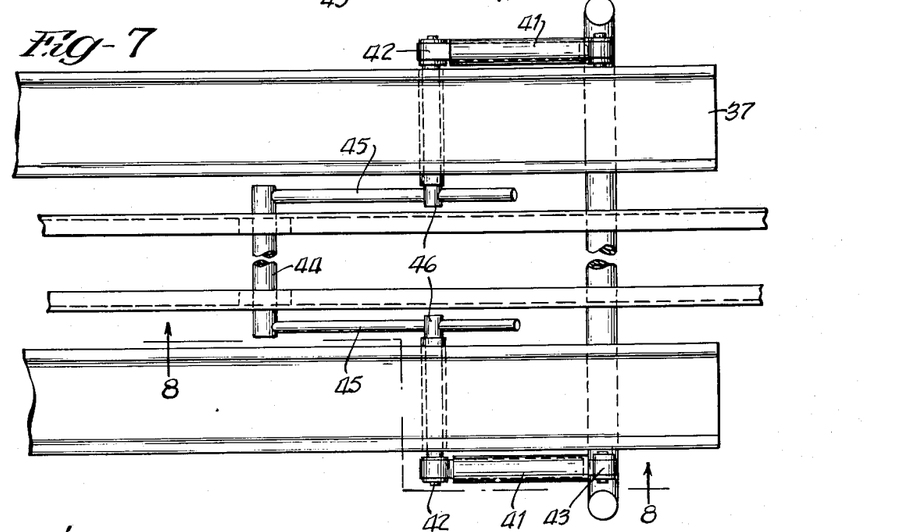
Fig. 7 is a plan view to an enlarged scale of the rear portion of the bottom track on the main section of the vehicle showing the elevating and stabilizing members.
Figure 8:
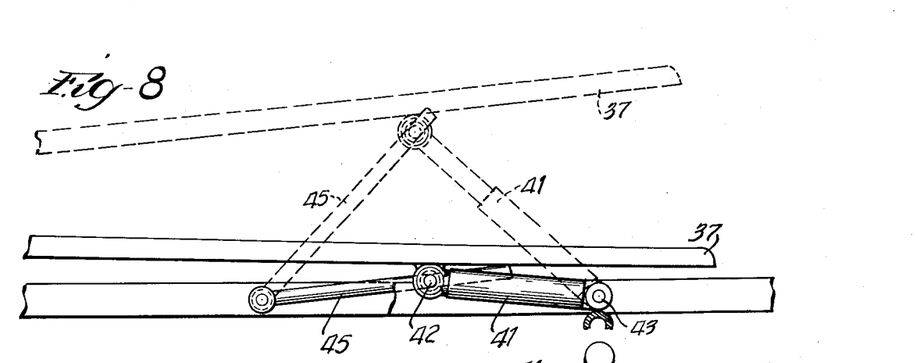
Fig. 8 is a section taken generally on the line 8—8 of Fig. 7.

The rearward bottom track section 37 extends from the pivot point 38 to adjacent the vertical frame member 17 at the rear of the vehicle section 10 and is supported at its rear end by link forming hydraulically operated extensible members 41 (Figs. 7 and 8). The hydraulic members 41 are pivotally connected at one end at 42 to supporting cross bars beneath track section 37 and at the other end 43 to the bottom frame members 20, the members 41 being arranged at opposite sides of the vehicle. The hydraulic members 41 comprise telescoping tubular cylinder and piston members which are moved relative to each other by a fluid supplied from a fluid pressure line forming part of the brake operating mechanism of the vehicle and controlled by suitable valve means. When extended the members 41 raise the rear end of the track section 37 to a level with the portion of the bottom of the vehicle extending between the side frame members 21 and above the rear wheels 13. In order to stabilize the elevation of the track section 37 a U-shaped bar or link having its bight portion 44 pivotally mounted on the frame between the side frame members 20 is provided (Figs. 7 and 8). The legs 45 of the stabilizer bar are slidable in apertures in the inner ends of relatively short cross bars 46 which are pivotally connected at their outer ends to the hydraulic members 41 at 42. This structure insures equal elevation of the tracks 37 when the load is greater on one side or the other. The track section 37 is held in the uppermost or elevated position for the loading of car A which may be accomplished when the trailer section 11 is either attached or detached. When the trailer section 11 is attached to the main section 10 loading skids 47 are positioned at the rear of the same and the upper track sections of both vehicle sections 10 and 11 are elevated as shown in Fig. 3, in a manner which will be described. When the trailer section 11 is detached from the main section 10 the skids 47 are positioned to load car A directly over the rear floor of the main section 10, the uper track sections being in elevated position. When car A is in proper position thereon the track section 37 is lowered by the hydraulic members 41 to permit rearrangement of the upper track which is provided for supporting car B which is the next car to be loaded.

The supporting track for car B comprises front and rear frame forming track sections 48 and 49 pivotally connected to each other and to the vehicle frame at 50. The forward track section 48 extends horizontally above front frame members 19 toward the front of the vehicle and is supported at its forward end on a pivotally mounted U-shaped supporting bar 51 which may be similar to the supporting bar 39 which is provided at the forward end of lower track section 36. The rearwardly extending track section 49 is somewhat longer than the section 48 and is supported at its rear end on a cross bar 52 having end extensions which are received in pocket forming brackets 53 on the top frame members 23 adjacent the upper ends of the vertical frame members 16.

The track for supporting car C on the main unit 10 of the vehicle comprises a single frame forming section 54 which is secured at a short distance from the forward end to a cross bar 55. The cross bar 55 extends outwardly at its ends and is received in track or guideway forming slots 56 in upstanding side members 57 which project above the rear portion of the longitudinal top side frame members 23. The cross bar 55 is slidable in the slots 56 and in the forward position is free to move upwardly out of the slots 56 which are open at the upper forward side and closed at the rearward ends at 58. The forward end of the track section 54 is pivotally connected at 59 (Figs. 1 and 10) to one end of a short track section 60. The track section 60 is pivotally connected at its other end at 61 to one end of a similar track section 62. The track section 62 is pivotally connected at its other end at 63 to the cross bar 52. The short track sections 60 and 62 form link-like pivotal connecting members between the track sections 49 and 54 which are foldable in jackknife fashion to permit swinging movement of the track section 54 about the cross bar 55 and also vertical movement of the track section 54 and the rear end of track section 49 into a raised position (Fig. 3) to clear car A when it is being loaded as car A moves across the raised section of the floor at the rear of the section 10 and onto the track section 37.

Movement of track section 54 is controlled by operation of pairs of connected hydraulic members 64 and 65. One end of each member 64 is pivotally connected at 66 near the rearward end of the track section 54. The other end of each member 64 is pivotally connected at 67 to one end of a member 65. The other end of member 65 is pivotally connected at 68 to the vertical side frame member 16. The pivotal connecting members 67 between the members 64 and 65 are extended laterally and received in a slot 69 in a side plate 70 which is secured in upwardly and rearwardly angled relation adjacent the bottom floor portion of the vehicle and above the rear wheels 13. The hydraulic members 64 and 65 comprise extensible, telescoped cylinder and piston members which are operated by hydraulic pressure, and which are adapted to be extended to position the track section 54 in longitudinally extended relation with the upper side frame members 23 and slightly above the latter (Fig. 4) or in a fully raised position substantially above the top vehicle frame members 23 (Fig. 3) to clear car A when it is loaded.

The track section 54 is locked in its uppermost position by locking pins 71 (Fig. 10) which are pivoted at 72 to the track section 54 and engageable in locking relation with keeper plates 73 secured on the collapsible or pivotally connected track sections 60 and 62 at the pivot point 61. The track section 54 is arranged in the intermediate elevated position (Fig. 4) for loading car B and also car C, the forward end being held in position by engagement of the ends of cross bar 55 in the rear closed portions 58 of slots 56. The track section 54 is shifted to its lowermost or hauling position (Fig. 5) by the hydraulic members 64 and 65 after car C is loaded thereon.

Figure 6:
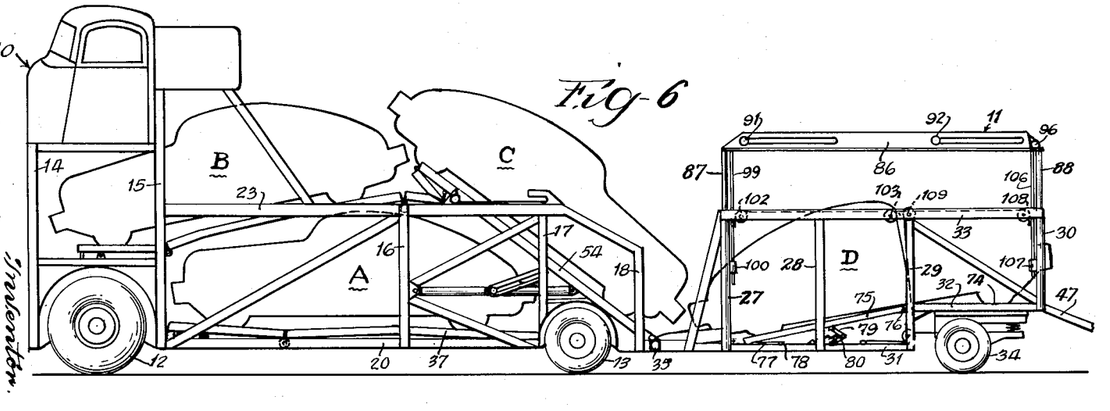
Fig. 6 is a side elevation with four automobiles in fully loaded position thereon.

The trailer unit or section 11 is provided with supporting track structures for cars D and E which track structures are arranged to be moved to permit loading of cars A, B and C. The supporting track for car D, which is the fourth car loaded, comprises a fixed section 74 arranged between side frame members 32 above the wheels 34 of the trailer unit 11 and a forwardly extending movable section 75 pivotally connected at 76 to the fixed section 74 so that its forward end is swingable from a lowered position to a substantially horizontal position in alignment with the fixed section 74 (Fig. 3). In the raised horizontal position the forward end of the track section 75 is supported by a U-shaped bar member 77 having the ends of its legs hinged at 78 to the bottom frame side members 31. The member 77 is movable manually upwardly into supporting relation with the forward end of the track section 75 in the same manner as supporting bar 39 at the front end of track section 36. Vertical movement of the track section 75 is caused by counterbalancing links 79 and 80 which are pivotally connected to each other at 81 and to the track section 75 and the lower frame member 31, respectively, at 82 and 83. A tension spring 84 is connected at one end at the pivot point 81 and at the other end to the frame member 31 at 85. The spring 84 tends to move the track section 75 vertically into the elevated position. The track section 75 is depressed by the weight of car D when the latter is backed into position thereon and the supporting bar member 77 is swung downward into non-supporting position (Fig. 6).

The upper track structure for supporting car E comprises a vertically movable frame which includes longitudinally extending side plate members 86 and front and rear vertical posts 87 and 88 secured thereto which are received in telescoped relation in the uprights 27 and 30 forming part of the side framing of the trailer unit 11. The movable supporting frame is provided with two track sections 89 and 90. The forward or front track sections 89 is relatively long and includes forward and rear cross bars 91 and 92 which extend at their ends and are received in sliding relation in slots 93 and 94 in the side plates 86 of the frame, permitting the track section 89 to be moved rearwardly the length of the slots. The rear track section 90 is connected at the forward end to the front track section 89 by removable pins 95, the rear end of the section 90 including a rear cross bar 96 which rests on the movable frame. The rear track section 90 may be disconnected from the front track section 89, by removal of the pins 95, and positioned between the forward end of lower track section 75 in unit 11 and the raised bottom portion at the rear of the main unit 10 to bridge the space between the units during loading of car A on the main unit 10 (Fig. 3).

Figures 10, 11:
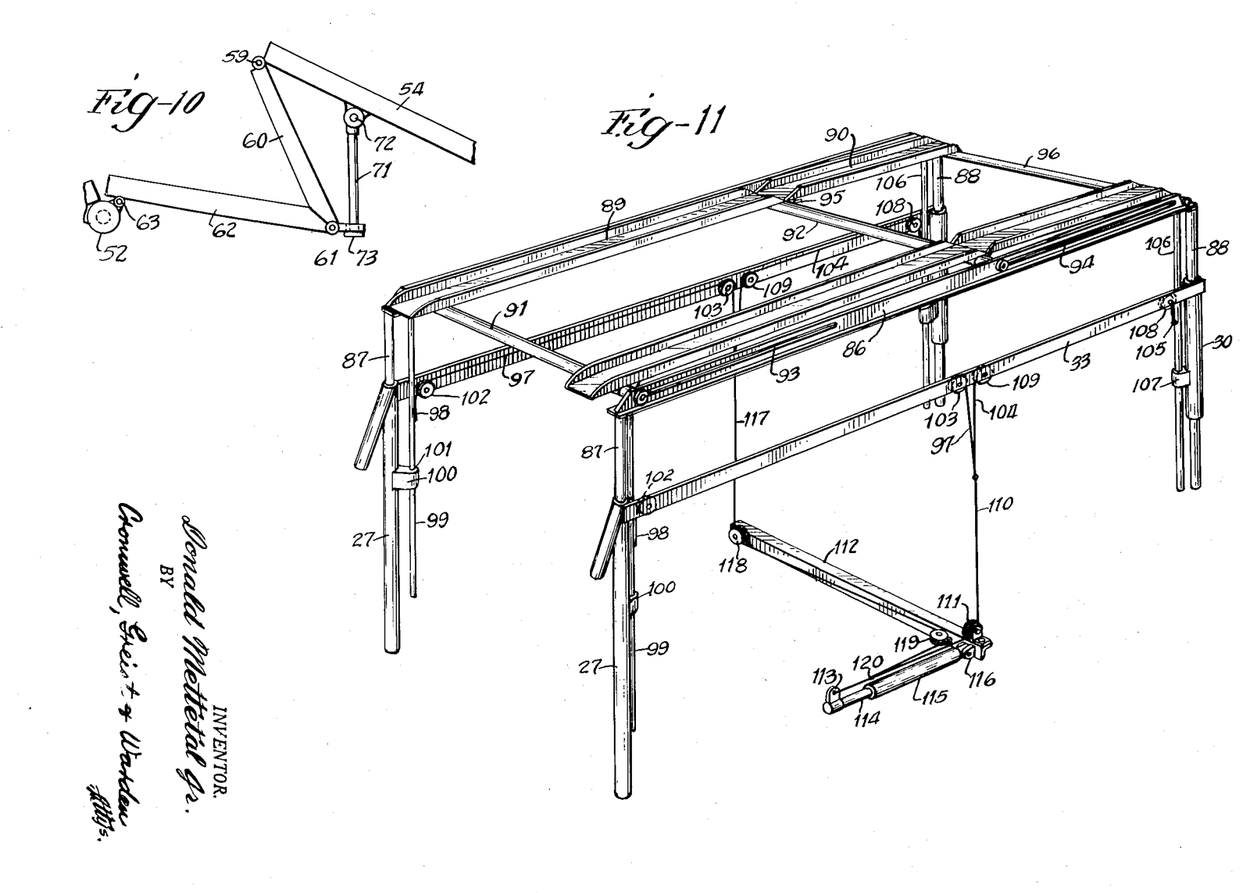
Fig. 10 is a detail elevation showing the connection between the top track members on the main section of the vehicle.
Fig. 11 is a detail perspective view showing portions of the trailer section.
Figure 12:
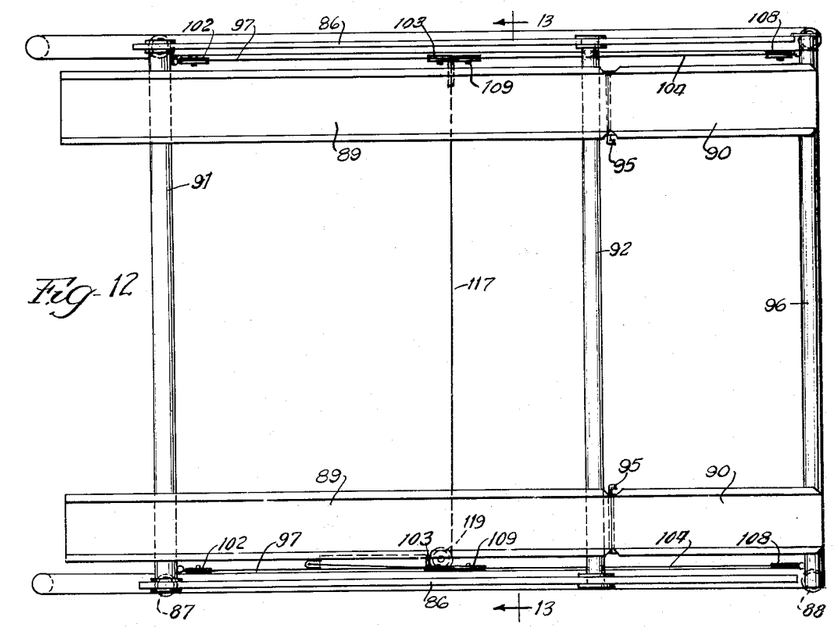
Fig. 12 is a plan view to an enlarged scale of the top of the trailer section.
Figure 13:
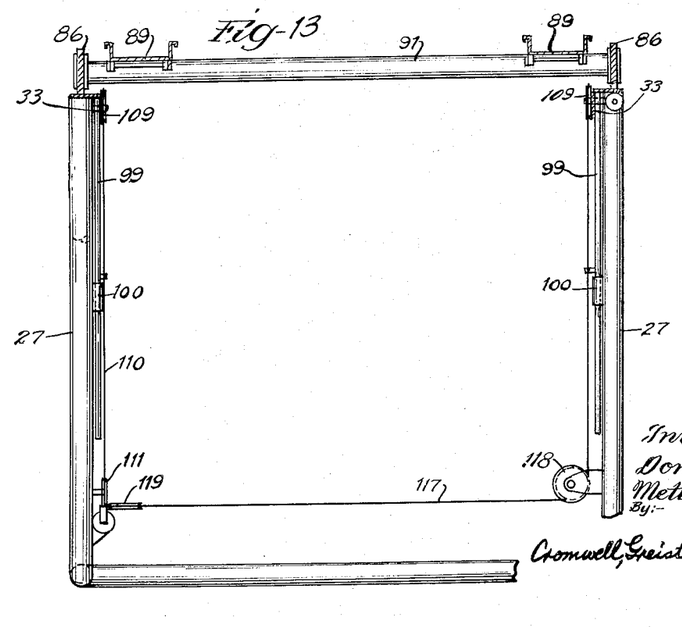
Fig. 13 is a section taken generally on the line 13—13 of Fig. 12.

The upper track structure is moved vertically by means of cables which are hydraulically operated. A pair of the cables 97 are connected at one end by brackets or plates 98 to an intermediate portion of vertically movable forward post members 99 (Figs. 11 to 13). The forward posts 99 are secured at their tops to the movable frame adjacent the vertically extending guide posts 87 and are guided in their vertical movement by brackets 100 having vertical holes 101 through which they extend in sliding relation. The brackets 100 are secured to vertical frame members 27 which receive the guide posts 87 in telescoped sliding relation therein. The cables 97 pass upwardly around pulleys 102, which are journaled on the upper side frame members 33, and then horizontally in the longitudinal direction of the unit to pulleys 103 which are journaled on the side frame members 33 adjacent the top of the uprights 29. A pair of cables 104 are connected at one end by the plates 105 to vertically movable rear post members 106 which are similar to front post members 99 and which are connected at their tops to the movable frame adjacent the rear guide posts 88. The post members 106 are guided vertically by brackets 107 secured to rear frame posts 30 which receive the guide posts 88 in telescoping sliding relation. The cables 104 pass upwardly around pulleys 108 which are journaled on the side frame members 33 and then horizontally to the pulleys 109 which are journaled on the side frame members 33 adjacent the pulleys 103. The ends of cables 97 and 104 on one side of the unit 11 are connected to cable 110 which extends downwardly to pulley 111 which is journaled on the frame structure 112 adjacent bottom side frame member 31. Cable 110 extends from the pulley 111 to the end 113 of the movable portion or piston 114 of a hydraulically operated device which has a fixed cylinder member 115 secured to the frame structure 112 at 116. Cables 97 and 104 at the other side of the unit 11 are joined to cable 117 which extends downwardly over the pulley 118, which is journaled on the left frame structure 112, and horizontally to pulley 119, which is journaled on the frame structure 112 at the opposite side of the unit 11 adjacent bottom side frame member 31. From pulley 119 the cable 117 extends to a connection 120 with cable 110. When piston member 114 is extended the movement of the cables 110, 117, 97 and 104 elevates the frame side plates 86 and the upper track sections which they carry are raised to the desired height above the bottom track sections to permit cars A and D to be loaded.

Track forming guide members 121 are provided at opposite sides along the forward ends of the bottom side frame members 31 of trailer unit 11 supporting the rear end of the track section 54 of the main unit 10 when the track section 54 is moved from its lowermost position (Fig. 1) to an elevated position (Fig. 4), and the end of the track section 54 is provided with rollers 122 for engaging the guide members 121. The track section moves rearwardly and then upwardly as the hydraulic members 64 and 65 are extended, the upward movement beginning when the ends of cross bar 55 reach the rearward ends 58 of slots 56.

The hydraulically operated devices which are employed to move the various sections of the car supporting track and to operate the cables for elevating the upper track sections of unit 11 are alike and each comprises a movable piston member telescoped within a chamber forming outer member. A suitable fluid under pressure is supplied to the hydraulic devices from a fluid line connecting with the hydraulic brake system and suitable valve controlling mechanism is provided for selectively operating any of the devices desired at any particular time.

Assuming the track sections are in load hauling position (Fig. 1) but without any load being positioned on the vehicle, except for track section 75 which is elevated by spring 34 when unloaded, the cars A, B, C, D and E are loaded as follows: Hydraulic members 64, 65 are actuated to elevate track sections 54 and 49 on the main unit 10, the locking pins 71 being engaged in locking relation with keeper plates 73, and the movable upper frame on the trailer unit 11 is elevated by the hydraulic members 114, 115, after the rear track section 90 has been removed and positioned between track section 75 and the main unit 10. The bottom rear track section 37 is elevated by hydraulic members 41 and skids 47 are positioned at the rear of the trailer unit 11. Car A is then driven onto the main unit 10. Thereafter, the track section 37 is moved downward to place car A in the hauling position, the same being secured thereto by chains or other conventional fastening devices.

Figure 4:
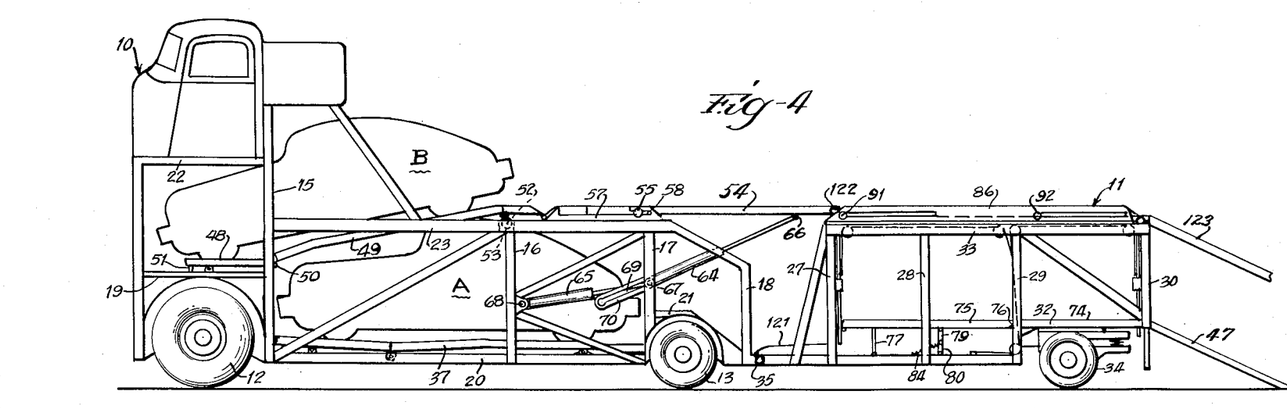
Fig. 4 is a side elevation with two automobiles in fully loaded position thereon.
Figure 5:
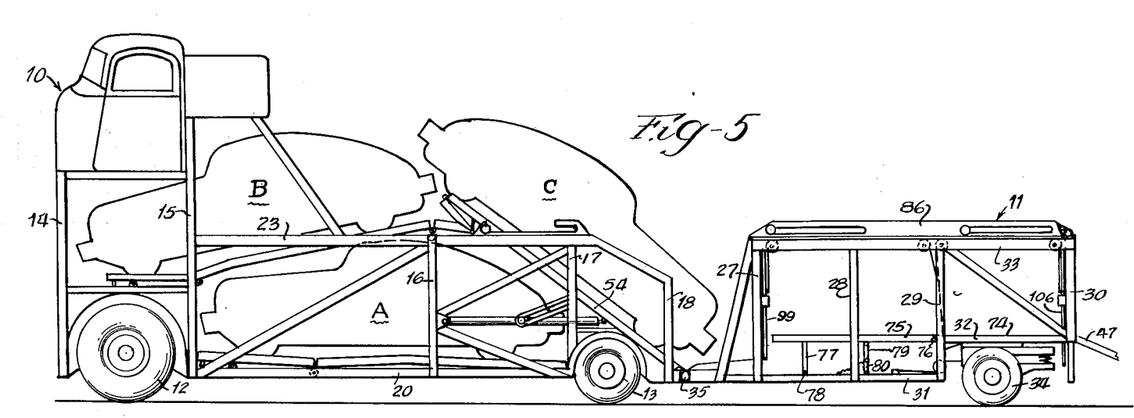
Fig. 5 is a side elevation with three automobiles in fully loaded position thereon.

Track sections 49 and 54 are then lowered into position in extended relation as shown in Fig. 4 and the upper track carrying frame of the trailer unit 11 is moved to the lowered position. The upper track section 89 is moved forward and rear track section 90 is replaced in extended relation with the same. A suitable skid 123 is positioned to connect the rear of the top track section 90 with the ground. Car B is then driven to the upper deck of the main unit 10 with the forward portion thereof on the forward track section 48 extending beneath the cab 24 and the rear portion thereof on the track section 49 after which it is secured in position thereon by chains or the like.

With the track sections in the same position car C is backed onto the track section 54. Car C is then secured by chains or other locking means to the track section 54 and the latter is moved by operation of the hydraulic members 64, 65 to an inclined position as in Fig. 5.

The upper deck of the trailer unit 11 is then elevated by means of the hydraulically operated cables and the skids 123 removed. Car D is backed onto the lower deck of the trailer unit 11 over the loading skids 47. When car D is in position on the lower track section 75 the supporting bar 77 is moved into non-supporting relation and the track section 75 is depressed by the weight of the car D, leaving the forward end of the car in elevated relation on the back portion 74 of the floor of the trailer unit 11.

Car E is loaded onto the vehicle last by replacing the skids 123, after the top deck structure is lowered, and backing car E onto the upper deck in proper position where it is secured to the track sections.

When the automobiles are unloaded from the vehicle the operations are reversed and the cars are removed in reverse order with the track sections manipulated as required.

While specific details of construction have been referred to in describing the illustrated form of the invention, various modifications will be apparent and may be resorted to within the spirit of the invention.

I claim:

1. In a transporting vehicle for hauling other vehicles, a supporting frame structure including side frame members, supporting wheel structures at the front and rear ends of said vehicle, a driver's cab mounted on said supporting frame structure in vertically spaced relation above the front wheel structure, vehicle supporting track members forming a lower deck arranged between said front and back wheel structures, other vehicle supporting track members forming an upper deck supported on said side frame members in spaced relation above said first mentioned track members, the track members on said upper deck being mounted on pivotally related front and rear frames, one end of said front frame being pivotally connected to the side frame members adjacent the front wheel structure and in vertically spaced relation beneath the bottom of said cab structure, the other end of said front frame being supported on an intermediate portion of said vehicle side frame members and being adapted to swing in a vertical direction, said rear frame being provided with a cross bar at the forward portion thereof, a trackway on said vehicle side frame members adapted to receive said cross bar in generally horizontal sliding relation, extensible hydraulically operated arms pivotally connected to said side frame members and to said rear frame whereby said front and rear frames may be moved by operation of said hydraulic arms to an elevated position above the rear and intermediate portions of the lower deck to permit a vehicle to be positioned on the track members on the lower deck and said frames may be thereafter lowered into vehicle supporting relation on said side frame members to permit two vehicles to be loaded on the tracks thereon.

2. In a vehicle for transporting a plurality of other vehicles, a rigid side frame structure extending longitudinally of said vehicle, longitudinally extending vehicle supporting lower track members and longitudinally extending vehicle supporting upper track members, movable frame sections supporting said upper track members, one of said movable frame sections being relatively short and extending from adjacent the front of said vehicle to an intermediate portion thereof, said frame section being pivotally secured at its forward end and adapted for vertical swinging movement at its rearward end, another of said frame sections being connected to the rearward end of said first mentioned frame section for vertical movement therewith or horizontal movement rearwardly therefrom, and means for operating said last mentioned frame section selectively for vertical movement with said first mentioned frame section or for horizontal movement into extended relation relative to said first mentioned frame section.

3. In a transporting vehicle for hauling other vehicles, a supporting frame structure including side frame members, supporting wheel structures at the front and rear ends of said vehicle, a driver's cab mounted on said supporting frame structure in vertically spaced relation above the front wheel construction, vehicle supporting track members forming a lower deck arranged between said front and back wheel structures, other vehicle supporting track members forming an upper deck supported on said side frame members in spaced relation above said first mentioned track members, the track members on said upper deck being arranged to provide front and rear frames and a pair of relatively short intermediate hinged connecting frames, one end of said front frame being hingedly connected to the side frame members adjacent the front wheel structure and in vertically spaced relation beneath the bottom of said cab structure, the other end of said front frame being supported on an intermediate portion of said vehicle side frame members and being adapted to swing in a vertical direction, said rear frame being provided with a cross bar at the forward portion thereof, a trackway on said vehicle side frame members adapted to receive said cross bar in generally horizontal sliding relation, extensible arms pivotally connected to said vehicle side frame members and to said rear frame whereby said front and rear frames may be elevated by operation of said arms to permit a vehicle to be positioned on the track members on the lower deck and said frames may be thereafter lowered into vehicle supporting relation to permit two vehicles to be loaded thereon.

4. In a transporting vehicle as recited in claim 3, wherein said pair of intermediate connecting frames are adapted to be folded into collapsed relation and latching means is provided thereon for retaining said frames in collapsed relation while said front and rear frames are swung into elevated position.

5. A vehicle for transporting automobiles comprising a main unit and a disconnectable trailer unit, said trailer unit being adapted to be connected at its forward end to the rearward end of said main unit and operating therewith as a single vehicle, side frame members on said main unit and side frame members on said trailer unit, lower and upper automobile supporting track sections arranged in vertically spaced relation on said main unit and said trailer unit and forming thereon lower and upper track assemblies, respectively, the upper track assembly on said main unit having front and rear sections connected by extensible intermediate sections, a pivotal and sliding connection between the rear section of said upper track assembly and the side frame members on said main unit, and extensible arm members between said rear section of said upper track assembly and said side frame members of said main unit whereby said upper track assembly may be extended and supported in horizontally aligned relation with the upper track assembly of said trailer unit and said trailer unit having a separable upper track section adapted to be removed therefrom and inserted between the lower track assemblies of the main unit and the trailer unit whereby to permit automobiles to be moved onto the trailer unit and across the lower and upper track assemblies thereon to position the same on the track assemblies of the main unit.

6. A vehicle for transporting automobiles comprising a power unit and a trailer unit, said trailer unit being connected at its forward end to the rearward end of said power unit and operating therewith as a single vehicle, said trailer unit having upper and lower automobile supporting track structures forming spaced decks adapted to support thereon two automobiles in superimposed relation, said power unit having front and rear wheel structures and an automobile supporting track structure constituting a lower deck arranged between the same, an elevated driver's cab arranged in spaced relation above said front wheel structure, movable automobile supporting track structures connected to form an upper deck arranged in spaced relation above said wheel structures, said upper deck track structures being extensible and contractable in the lengthwise direction of the power unit, means for moving said upper deck to a horizontally extended position in alignment with the upper deck on the trailer unit or to a contracted position for supporting thereon two automobiles with the forward portion of the forward automobile in the space between the elevated cab and the front wheel structure and the rearward automobile inclined downwardly and rearwardly over an automobile positioned on the lower deck on said power unit.

7. A vehicle for transporting automobiles having front and rear wheel structures and an automobile supporting track structure arranged to form a lower deck between the same, an elevated driver's cab arranged in spaced relation above said front wheel structure, a plurality of pivotally connected automobile supporting track structures arranged in spaced relation above said wheel structures and forming an upper deck above said wheel structures, said upper deck being pivotally mounted at the forward end of the vehicle in spaced relation beneath said driver's cab and being connected for positioning longitudinally of said vehicle in rearwardly extended relation or in contracted partially folded relation, and means including extensible arms between the rear end of said upper deck and said vehicle for selectively positioning said upper deck with the pivotally connected track structures thereof in extended relation, in raised partially folded relation or in lowered automobile supporting relation whereby to load thereon two automobiles, said upper deck supporting, when in the lowered partially folded relation, said two automobiles with the forward portion of the forward automobile in the space between the elevated cab and the front wheel structure and with the rearward automobile inclined downwardly and rearwardly over an automobile positioned on said lower deck.

8. A vehicle for transporting automobiles comprising a power unit and a trailer unit, said trailer unit being connected at its forward end to the rearward end of said power unit and operating therewith as a single vehicle, upper and lower automobile supporting track structures on said trailer unit adapted to support thereon two automobiles in superimposed relation, said power unit having front and rear wheel structures and a lower automobile supporting track structure arranged between the same, said lower automobile supporting track structure being adapted to receive a single automobile in supported relation thereon, an elevated driver's cab arranged in spaced relation above said front wheel structure, longitudinally extending vehicle supporting upper track members arranged above said wheel structures, movable frame sections supporting said upper track members, one of said movable frame sections being relatively short and extending from adjacent the front of the power unit to an intermediate portion thereof, said one frame section being pivotally secured at its forward end in spaced relation below said driver's cab and being adapted for vertical swinging movement at its rearward end, and means connecting another of said frame sections to the rearward end of said first mentioned frame section for vertical movement therewith or horizontal movement rearwardly therefrom, means for operating said last mentioned frame section selectively for vertical movement with said first mentioned frame section or for horizontal movement in extended relation relative to said first mentioned frame section and into alignment with the upper supporting track structure on said trailer unit, whereby two automobiles may be moved across the upper automobile supporting track structure on said trailer unit and loaded on the upper track members on said power unit with the forward portion of the forward automobile extending into the space between the elevated cab and the front wheel structure.

References Cited in the file of this patent
UNITED STATES PATENTS

| | | |
|---|---|---|
| Re. 23,187 | Garnett | June 10, 1950 |
| 2,103,669 | Francis | Dec. 28, 1937 |
| 2,104,734 | Carpenter | Jan. 11, 1938 |
| 2,146,567 | Dondlinger | Feb. 7, 1939 |
| 2,377,641 | Miner | June 5, 1945 |
| 2,407,007 | Henricksen | Sept. 3, 1946 |
| 2,432,228 | DeLano | Dec. 9, 1947 |
| 2,492,829 | Baker | Dec. 27, 1949 |
| 2,492,980 | Garnett | Jan. 3, 1950 |
| 2,647,009 | Huebshman | July 28, 1953 |
| 2,647,010 | Huebshman | July 28, 1953 |